United States Patent
Mizutani et al.

(10) Patent No.: US 6,542,799 B2
(45) Date of Patent: Apr. 1, 2003

(54) VEHICLE TROUBLE DIAGNOSIS METHOD, VEHICLE TROUBLE DIAGNOSIS APPARATUS AND COMPUTER-READABLE RECORD MEDIUM RECORDING TROUBLE DIAGNOSIS PROGRAM

(75) Inventors: Yuji Mizutani, Aichi (JP); Yusuke Hara, Aichi (JP); Toshiyuki Abe, Aichi (JP); Akira Yasuda, Aichi (JP)

(73) Assignee: Mitsubishi Jidosha Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/725,858

(22) Filed: Nov. 30, 2000

(65) Prior Publication Data

US 2001/0002450 A1 May 31, 2001

(30) Foreign Application Priority Data

Nov. 30, 1999 (JP) ............................................. 11-339789

(51) Int. Cl.$^7$ ................................................. G06F 19/00
(52) U.S. Cl. ............................ 701/33; 701/30; 701/36; 340/439
(58) Field of Search ................................. 701/29, 30, 36, 701/33, 34, 35; 340/439, 870.01, 870.16

(56) References Cited

U.S. PATENT DOCUMENTS

| | | | | |
|---|---|---|---|---|
| 5,214,582 A | * | 5/1993 | Gray | 701/33 |
| 6,141,608 A | * | 10/2000 | Rother | 701/33 |
| 6,208,948 B1 | * | 3/2001 | Klingler et al. | 702/183 |
| 6,263,268 B1 | * | 7/2001 | Nathanson | 701/29 |
| 6,263,322 B1 | * | 7/2001 | Kirkevold et al. | 705/400 |
| 6,434,455 B1 | * | 8/2002 | Snow et al. | 701/33 |

FOREIGN PATENT DOCUMENTS

| | | | |
|---|---|---|---|
| EP | 422061 | * | 6/1999 |
| EP | 0997638 | * | 3/2000 |

* cited by examiner

*Primary Examiner*—William A. Cuchlinski, Jr.
*Assistant Examiner*—Marthe Y. Marc-Coleman
(74) *Attorney, Agent, or Firm*—Sughrue Mion, PLLC

(57) ABSTRACT

To connect a computer to an electronic control unit of a vehicle and diagnose the trouble state of the vehicle, the computer is connected to a server storing trouble diagnosis data required for trouble diagnosis, and the trouble diagnosis data is read from the server, trouble diagnosis is proceeded with in an interactive mode with the computer using the read trouble diagnosis data, and vehicle data is automatically acquired from the electronic control unit using the read trouble diagnosis data.

13 Claims, 8 Drawing Sheets

FIG. 10

TROUBLE SYMPTOM CLASSIFICATION TABLE

| | |
|---|---|
| COMMUNICATION WITH ECU IS IMPOSSIBLE | COMMUNICATION WITH ALL SYSTEMS IS IMPOSSIBLE |
| | COMMUNICATION ONLY WITH ECU IS IMPOSSIBLE |
| ENGINE WARNING LAMP | ENGINE WARNING LAMP DOES NOT GO ON JUST AFTER IGNITION SWITCH IS TURNED ON |
| | ENGINE WARNING LAMP DOES NOT GO OFF |
| START | NO INITIAL FIRE (START IS IMPOSSIBLE) |
| | INCOMPLETE FIRE ALTHOUGH INITIAL FIRE EXISTS (START IS IMPOSSIBLE) |
| | LONG START TIME (START FAILURE) |
| IDLE STABILITY (IDLE FAILURE) | IDLE IS UNSTABLE |
| | THE NUMBER OF IDLE REVOLUTIONS IS HIGH |
| | THE NUMBER OF IDLE REVOLUTIONS IS LOW |
| IDLE STABILITY (IDLE CONTINUITY FAILURE) | ENGINE STOP AT COOL MODE IDLING TIME |
| | ENGINE STOP AT WARM MODE IDLING TIME |
| | EMGINE STOP AT START TIME (PASS OUT) |
| | ENGINE STOP AT DECELERATION TIME |
| DRIVE PROPERTIES | SLOW GOING |
| | ACCELERATION FAILURE |
| | SURGE |
| | SHOCK AT ACCELERATION TIME |
| | SHOCK AT DECELERATION TIME |
| | KNOCKING |

VEHICLE TROUBLE DIAGNOSIS METHOD, VEHICLE TROUBLE DIAGNOSIS APPARATUS AND COMPUTER-READABLE RECORD MEDIUM RECORDING TROUBLE DIAGNOSIS PROGRAM

BACKGROUND OF THE INVENTION

1. Field of the Invention

This invention relates to a vehicle trouble diagnosis method, a vehicle trouble diagnosis apparatus and a computer-readable record medium recording a trouble diagnosis program for diagnosing the trouble state of a vehicle while communicating with an electronic control unit of the vehicle.

2. Description of the Related Art

Some trouble might occur in vehicles such as automobiles, etc. To repair a vehicle having a trouble, it becomes necessary to determine the causes of the trouble. Thus, in garages, etc., maintenance handbooks describing a trouble diagnosis method corresponding to each of vehicle models, etc., are ready for facilitating determination of the trouble cause. However, because the maintenance handbooks are massive, it takes large amount of work and time in searching for the necessary description and it might result in taking time in trouble diagnosis.

Then, hitherto the following trouble diagnosis method has been executed: Troubleshooting information for each trouble symptom described in the maintenance handbooks is input as data into a personal computer. Then, trouble diagnosis is proceeded with according to instructions in an interactive mode with the personal computer.

However, to manually convert the troubleshooting information described in the maintenance handbooks into data in the personal computer, it takes time in data preparation work. Therefore, only troubleshooting flowcharts are converted into data conventionally. As a result, the detailed contents of inspection work must be checked by checking the corresponding pages of the maintenance handbook as required, and it is feared that it takes time in trouble diagnosis. It is also feared that erroneous data might be entered because the data is manually input into the computer.

Further, if it is necessary to diagnose a control machine of an engine, etc., according to the trouble symptom, a dedicated measuring instrument (scan tool) is connected to the electronic control unit of the vehicle for measuring data required for the trouble diagnosis; it is feared that a trouble diagnostician having a little knowledge on (poor experience in) the operation method of the measuring instrument and the measured data evaluation method may require much time in trouble diagnosis or conduct erroneous diagnosis.

SUMMARY OF THE INVENTION

It is therefore an object of the invention to provide a vehicle trouble diagnosis method, a vehicle trouble diagnosis apparatus, and a computer-readable record medium recording a trouble diagnosis program for making it possible to execute rapid and reliable trouble diagnosis.

To the end, in a vehicle trouble diagnosis method of the invention, to connect a computer to an electronic control unit of a vehicle and diagnose trouble state of the vehicle, first the computer is connected to a server storing trouble diagnosis data required for trouble diagnosis and the trouble diagnosis data is read from the server (data read step), trouble diagnosis is proceeded with in an interactive mode with the computer using the read trouble diagnosis data (trouble diagnosis step), and vehicle data is automatically acquired from the electronic control unit using the trouble diagnosis data (automatic vehicle data acquisition step).

Preferably, new trouble diagnosis data is added from the server to the computer in response to the acquisition result of the vehicle data at the automatic vehicle data acquisition step (additional data read step), and trouble diagnosis is further proceeded with in the interactive mode with the computer using the new read trouble diagnosis data (additional diagnosis step).

More preferably, the trouble diagnosis data is stored in the server as a data structure in an open format as a part of vehicle maintenance description data, and at the trouble diagnosis step, the trouble diagnosis data is extracted from the vehicle maintenance description data and is converted into a data structure that can be displayed in an interactive mode and the trouble diagnosis data resulting from the converting is used to proceed with the trouble diagnosis in the interactive mode with the computer.

In a vehicle trouble diagnosis apparatus of the invention, trouble diagnosis data is read via a server connection interface from a server storing the trouble diagnosis data required for trouble diagnosis by data a read section and an instruction of a trouble diagnosis routine provided by processing the read trouble diagnosis data is given in an interactive mode by a diagnostic routine instruction section through a display section and an input section. An automatic vehicle data acquisition section automatically acquires vehicle data from an electronic control unit of the vehicle via a vehicle connection interface in response to the instruction of the diagnostic routine instruction section and displays the acquired vehicle data on the display section.

Preferably, new trouble diagnosis data is additionally read from the server in response to input to the input section and an instruction of a trouble diagnosis routine provided by processing the new read trouble diagnosis data is additionally given in the interactive mode by the diagnostic routine instruction section.

More preferably, the trouble diagnosis data is formed as a part of vehicle maintenance description data having a data structure in an open format, an extraction section extracts the trouble diagnosis data from the vehicle maintenance description data, a conversion processing section converts the extracted trouble diagnosis data into a data structure that can be displayed in the interactive mode, and the diagnostic routine instruction section displays the trouble diagnosis data resulting from the converting, thereby giving a trouble diagnosis routine instruction in the interactive mode.

Further, with a computer-readable record medium recording a trouble diagnosis program of the invention, the recorded trouble diagnosis program is executed in a computer, thereby causing the computer to provide a connection function to a server storing trouble diagnosis data required for trouble diagnosis, a connection function to an electronic control unit of a vehicle, a read function of the trouble diagnosis data from the server, a function of giving an instruction of a trouble diagnosis routine provided by processing the read trouble diagnosis data in an interactive mode through an display section and an input section, and a function of automatically acquiring vehicle data from the electronic control unit in response to the instruction and displaying the acquired vehicle data on the display section.

Preferably, the recorded trouble diagnosis program is executed in a computer, thereby causing the computer to provide a function of additionally reading new trouble diagnosis data from the server in response to input to the input section and a function of additionally giving an instruction of a trouble diagnosis routine provided by processing the new read trouble diagnosis data in the interactive mode.

More preferably, the recorded trouble diagnosis program is executed in a computer, thereby causing the computer to provide a function of extracting the trouble diagnosis data from vehicle maintenance description data having a data structure in an open format, a function of converting the extracted trouble diagnosis data into a data structure that can be displayed in the interactive mode, and a function of displaying the trouble diagnosis data resulting from the converting, thereby giving a trouble diagnosis routine instruction in the interactive mode.

The data structure in the open format is a data structure independent of specific systems or programs: for example, SGML data corresponds thereto. For example, HTML data corresponds to the data structure that can be displayed in the interactive mode.

BRIEF DESCRIPTION OF THE DRAWINGS

FIG. 10 is a drawing to show a screen display example of the display section of the vehicle trouble diagnosis apparatus as the embodiment of the invention.

DETAILED DESCRIPTION OF THE PRESENT INVENTION

Referring now to the accompanying drawings, there are shown preferred embodiments of the invention.

Figure 1:
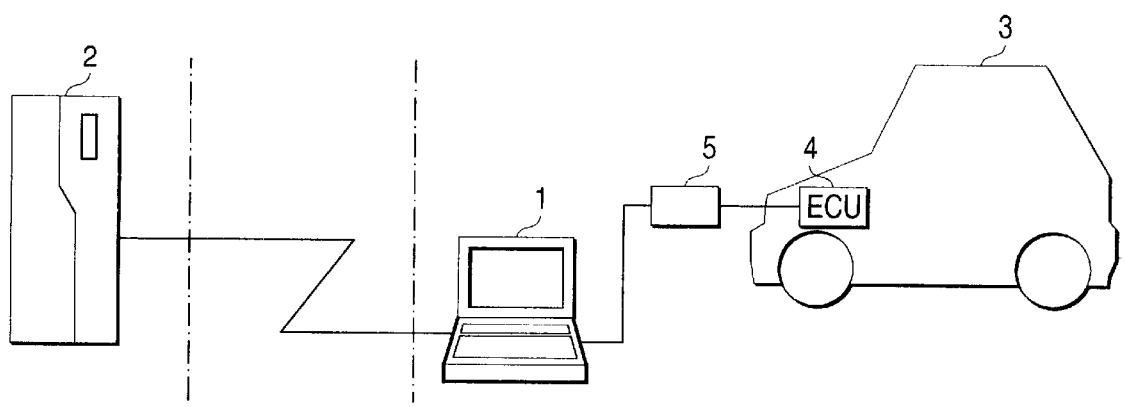
FIG. 1 is a drawing to show the configuration of a trouble diagnosis system using a vehicle trouble diagnosis apparatus as an embodiment of the invention.

FIG. 1 is a drawing to show configuration of a trouble diagnosis system using a vehicle trouble diagnosis apparatus in an embodiment of the invention. As shown in FIG. 1, the trouble diagnosis system comprises a server 2, and a trouble diagnosis apparatus (vehicle trouble diagnosis apparatus in the embodiment of the invention). The trouble diagnosis system is connected to a terminal ECU 4 and a communication terminal 5 of a vehicle 3 to communicate with each other.

The server 2 is installed in a central office for controling garages, and stores vehicle maintenance description data. In the embodiment, contents of the description in the maintenance handbooks are converted in the vehicle maintenance description data in SGML (standard generalized markup language) format. The SGML format is one of open document formats standardized independent of specific systems or programs, and Tags indicating the attributes, etc., of the document structures can be set for each of arbitrary document structures (document components such as chapters and paragraphs). The tags can be defined as desired. For example, in order to distinguish a description part concerning trouble diagnosis in the maintenance handbook from other parts, a tag for defining the description part as the description concerning trouble diagnosis may be set when the description part concerning trouble diagnosis is converted into data. In the embodiment, a tag defined according to the contents is set for each description, and the maintenance handbook is converted into SGML data.

The trouble diagnosis apparatus 1 is placed in each garage. The trouble diagnosis apparatus 1 is connected to the server 2 through a communication line such as a leased line or a public line. The trouble diagnosis apparatus 1 will be discussed below. The trouble diagnosis apparatus 1 is a dedicated machine having functions described below or may be a general-purpose personal computer in which a program for providing the functions described below is installed. Here, with reference to FIGS. 2 to 7, the trouble diagnosis apparatus 1 implemented using a personal computer will be described.

Figure 2:
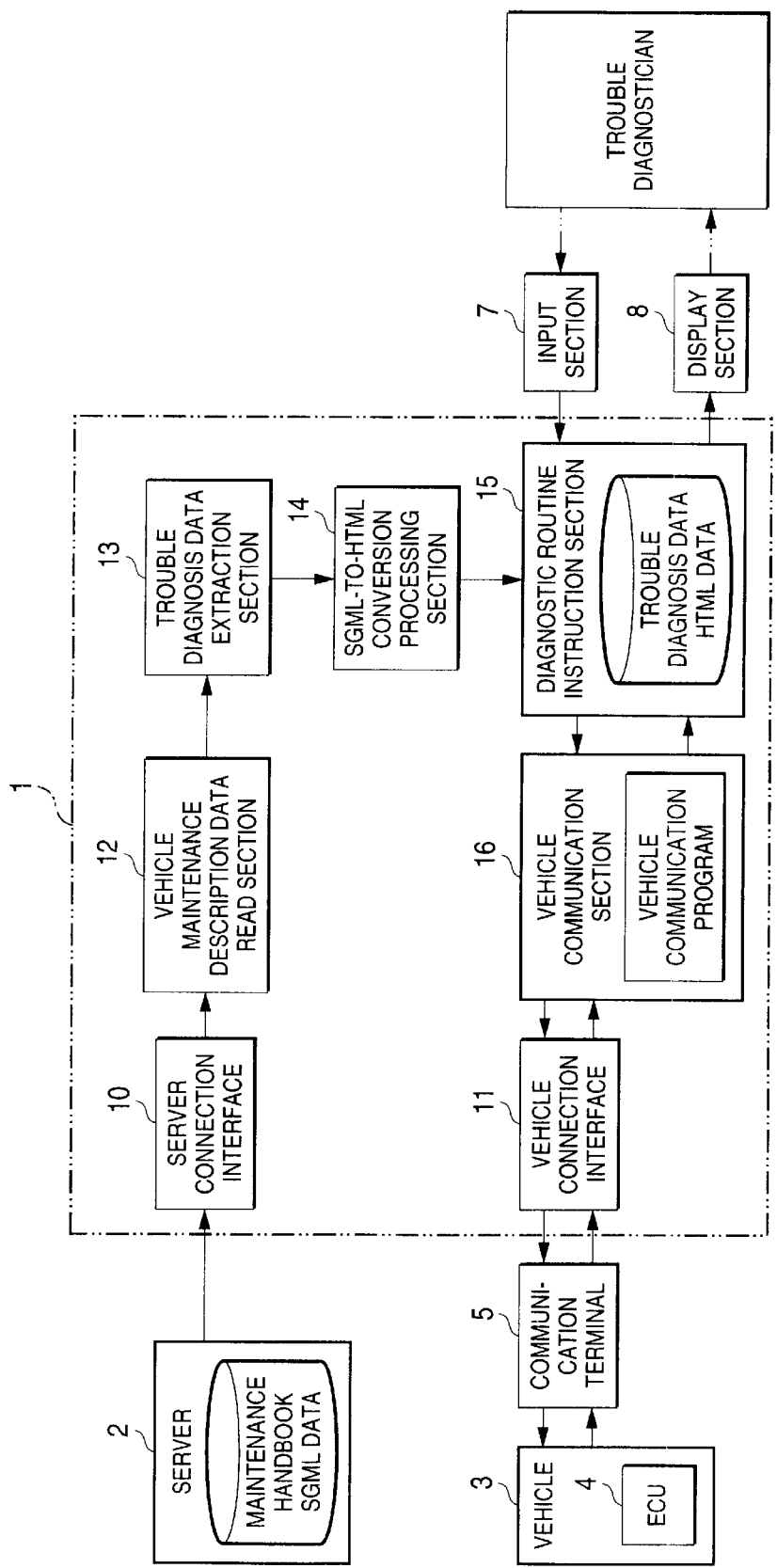
FIG. 2 is a functional block diagram to show the configuration of the vehicle trouble diagnosis apparatus as the embodiment of the invention.

FIG. 2 is a functional block diagram of the trouble diagnosis apparatus 1. The trouble diagnosis apparatus 1 comprises a server connection interface 10, a vehicle connection interface 11, an vehicle maintenance description data read section (data read means) 12, a trouble diagnosis data extraction section (extraction means) 13, a conversion processing section 14, a diagnostic routine instruction section 15, and a vehicle communication section (automatic vehicle data acquisition means) 16. The elements 10 to 16 are realized by hardware including a CPU, RAM, ROM, hard disk, and an I/O interface making up the personal computer, OS (operating system), and a dedicated program (trouble diagnosis program) in cooperation with each other.

The elements in the trouble diagnosis apparatus 1 will be discussed. First, the server connection interface 10 is an interface circuit for connecting the trouble diagnosis apparatus 1 to the server 2 and is connected to a communication line such as a leased line or public line. The vehicle connection interface 11 is an interface circuit for communicating with the electronic control unit (ECU) 4 of the vehicle 3, and is connected so as to be able to communicate with the ECU 4 through the communication terminal 5 connected by a communication cable.

The vehicle maintenance description data read section 12 is connected to the server 2 via the server connection interface 10 for down loading vehicle maintenance description data from the server 2 and recording the data in RAM or on hard disk. The vehicle maintenance description data read section 12 communicates with the server 2 periodically according to the count of an internal timer or as instructed by the trouble diagnostician through input section (keyboard, mouse, etc.,) 7.

Figure 3:
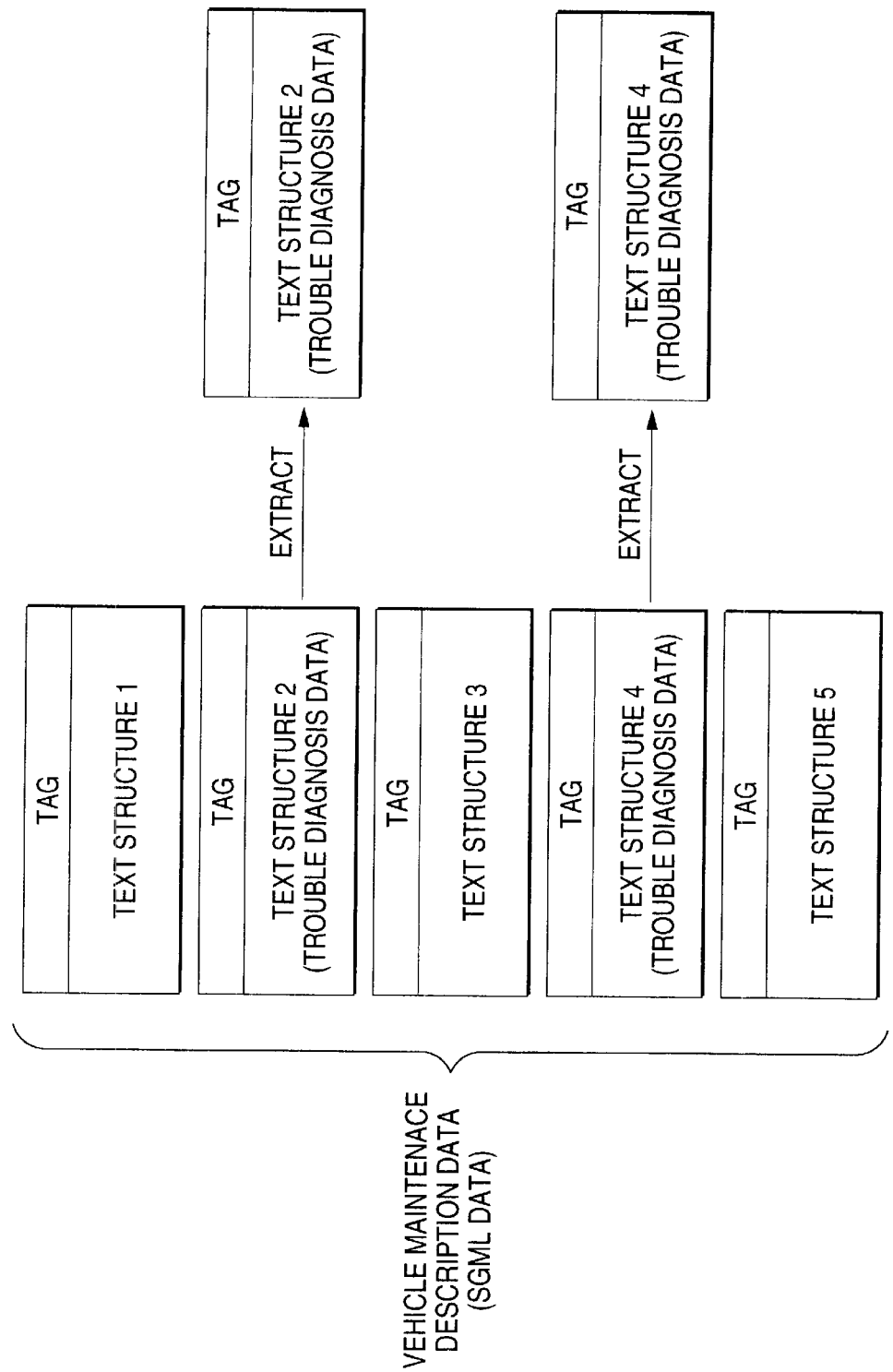
FIG. 3 is a schematic drawing to show the structure of SGML data related to the vehicle trouble diagnosis apparatus as the embodiment of the invention.

The trouble diagnosis data extraction section 13 is for extracting the trouble diagnosis data required for trouble diagnosis from among the vehicle maintenance description data read by the vehicle maintenance description data read section 12. Specifically, the SGML format serving as a data format of the vehicle maintenance description data includes a plurality of tagged text structures as shown in FIG. 3, and the trouble diagnosis data extraction section 13 extracts the text structure required for trouble diagnosis (trouble diagnosis data) from among the plurality of text structures by referring to the tags attached to the text structures. If there are limitations on setting tags, for example, if there is a limitation on types of tags that is set because of international or industrial arrangements for converting vehicle maintenance handbooks into data in the SGML format, a keyword search is made in the document to extract the document structure having the corresponding keyword as trouble diagnosis data. The trouble diagnosis data extraction section 13 first extracts data for a trouble symptom selection screen described later (see FIG. 10) and when the trouble diagnostician selects the trouble symptom on the trouble symptom selection screen of display section 8, the trouble diagnosis data extraction section 13 extracts the data corresponding to the selected trouble symptom.

The conversion processing section 14 is used for converting the trouble diagnosis data extracted by the trouble diagnosis data extraction section 13 into a data structure that can be displayed in an interactive mode. That is, the trouble diagnosis data is formed in the SGML format as described above, and thus cannot be displayed on the screen of the display section (display) 8 in the interactive mode without conversion. Then, the conversion processing section 14 converts the trouble diagnosis data in the SGML format into HTML-formatted data that can be displayed in the interactive mode through browser software. The conversion from the SGML format to the HTML format is executed by setting predetermined tags indicating display character size and layout, image layout, etc., according to the extracted trouble diagnosis data contents (tag contents or keyword in document). To relate the trouble diagnosis data pieces converted into the HTML format (HTML data pieces) to each other, links with any other relevant HTML data are set at the conversion time.

Figure 4:
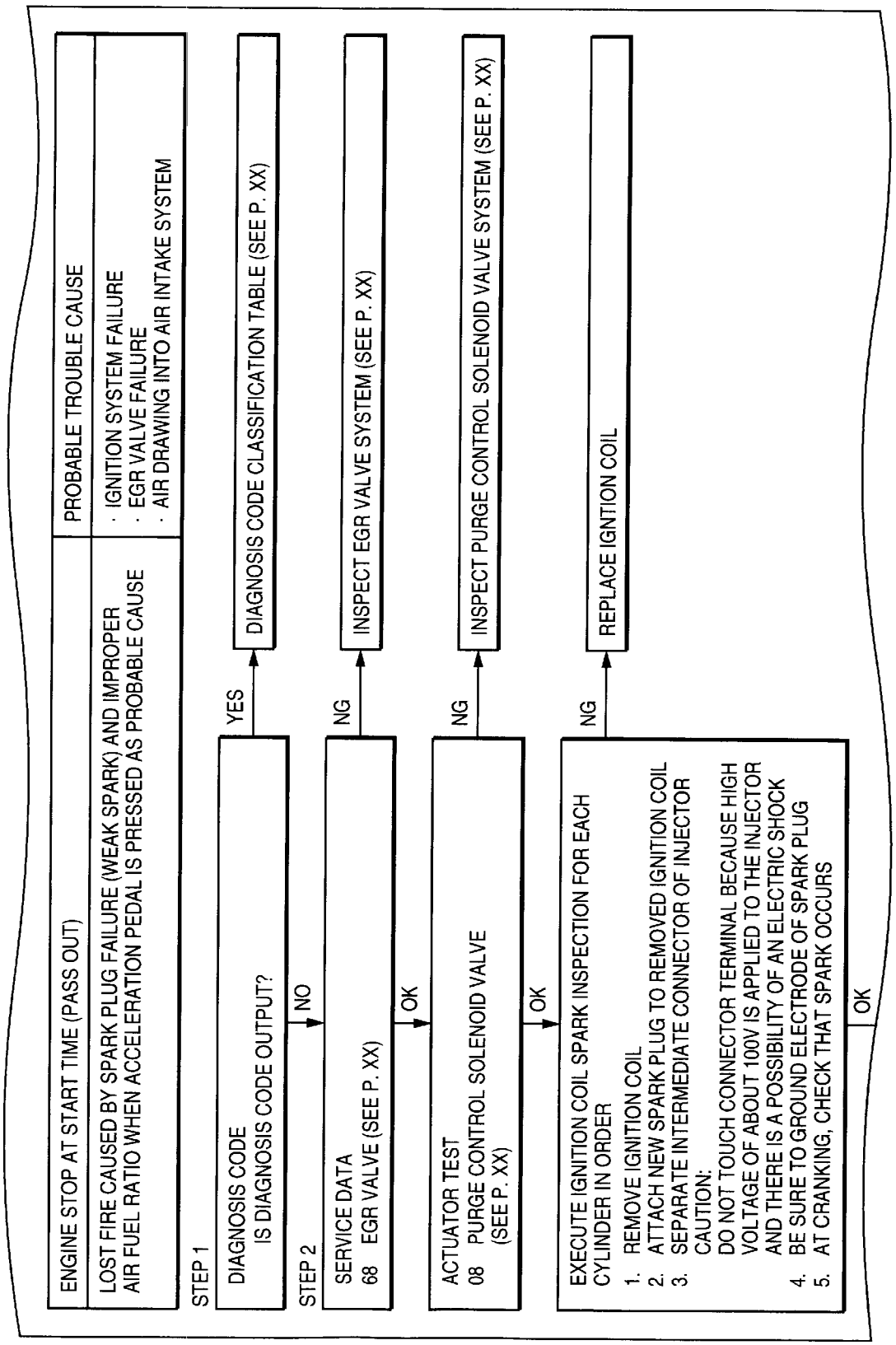
FIG. 4 is a drawing to show an example of a flowchart of troubleshooting related to the vehicle trouble diagnosis apparatus as the embodiment of the invention.
Figure 5A:
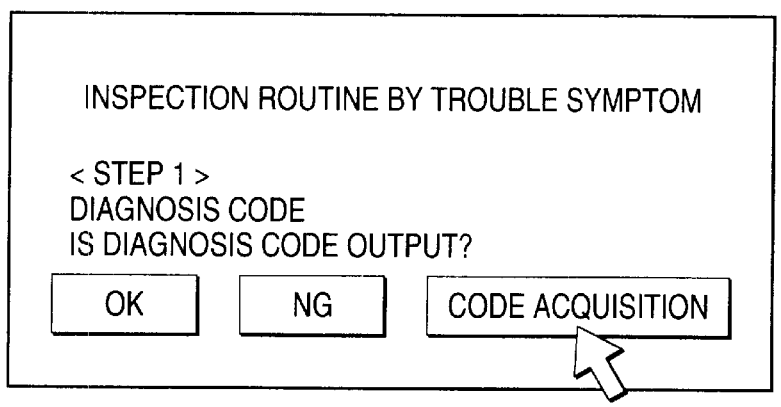
FIG. 5A is a drawing corresponding to STEP 1 in FIG. 4 as screen display examples of display section of the vehicle trouble diagnosis apparatus as the embodiment of the invention.
Figure 5B:
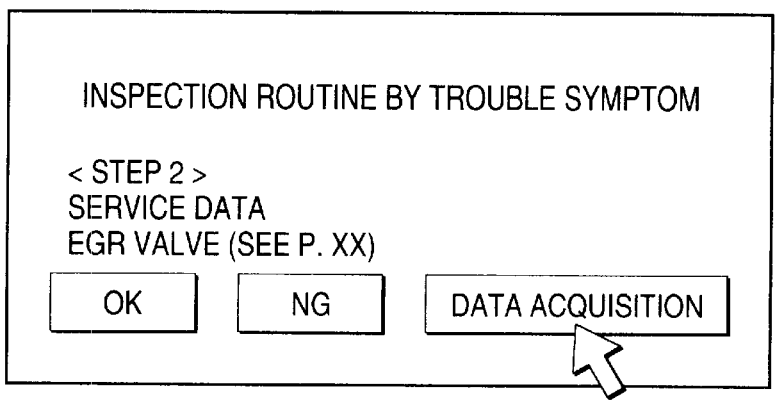
FIG. 5B is a drawing corresponding to STEP 2 in FIG. 4.

The diagnostic routine instruction section 15 is use for displaying the HTML data provided by the conversion processing section 14 on the display section 8 in the interactive mode using the browser software. Known commercial software can be used as the browser software. The diagnostic routine instruction section 15 displays the HTML data according to the setup link and this link is set following a troubleshooting flow as shown in FIG. 4. Therefore, the HTML data is displayed in response to entry of the trouble diagnostician through the input section 7 (for example, selection of Yes or No), whereby the trouble diagnosis routine can be indicated for the trouble diagnostician in the interactive mode. For example, FIGS. 5A and 5B show examples of messages displayed on the screen of the display section 8 when the flowchart shown in FIG. 4 is converted into data in the SGML format and this data is furthermore converted into HTML data; FIG. 5A shows a display example corresponding to STEP 1 in FIG. 4 and FIG. 5B shows a display example corresponding to STEP 2 in FIG. 4.

The vehicle communication section 16 is used for transferring data to and from the ECU 4 via the vehicle connection interface 11 according to an instruction of the diagnostic routine instruction section 15. Specifically, the vehicle communication section 16 starts a vehicle communication program (program forming a part of the trouble diagnosis program according to the invention) previously recorded on a hard disk drive unit, communicates with the ECU 4, and acquires the vehicle data specified in a parameter file passed from the diagnostic routine instruction section 15 (self-diagnosis data of the ECU 4 or data indicating the vehicle conditions such as $O_2$ sensor output value).

In more detail, in the trouble diagnosis apparatus 1, when the trouble diagnosis data is converted into the HTML data by the conversion processing section 14, a search is made for a predetermined keyword indicating the inspection item requiring acquisition of vehicle data and if the keyword is detected in the trouble diagnosis data, a start command for starting the vehicle communication program is added to the provided HTML data. When the HTML data is displayed on the display section 8 by the diagnostic routine instruction section 15, a parameter file specifying the vehicle data to be acquired at the same time is created and is passed to the vehicle communication section 16. When the parameter file is passed, the vehicle communication section 16 starts the vehicle communication program, communicates with the ECU 4, and acquires the specified vehicle data from the ECU 4.

Figure 6:
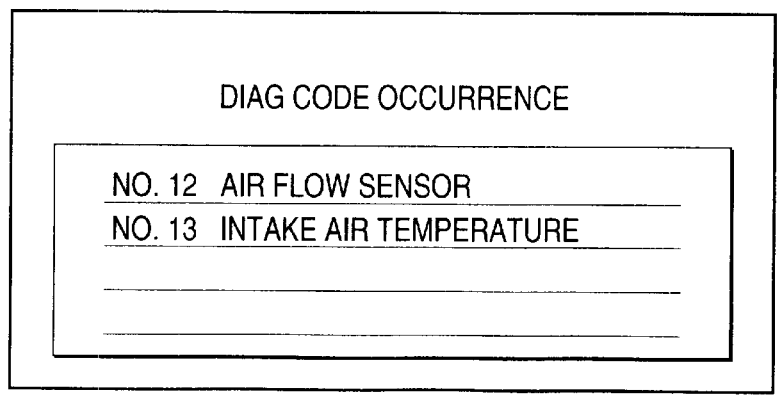
FIG. 6 is a drawing to show a screen display example of the display section of the vehicle trouble diagnosis apparatus as the embodiment of the invention.
Figure 7:
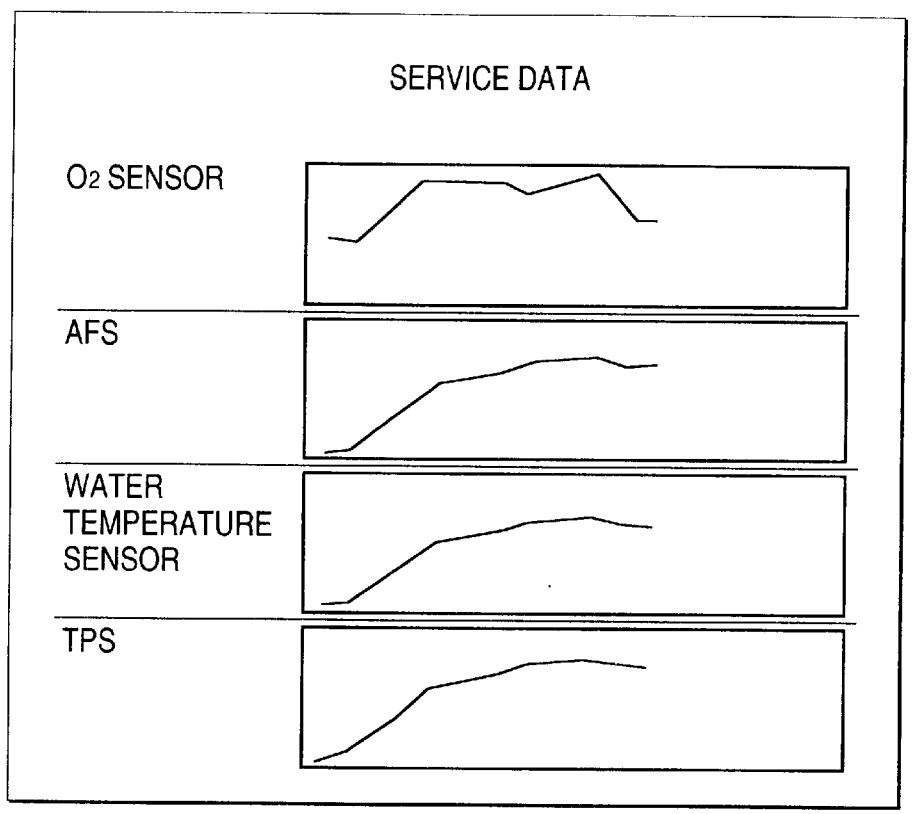
FIG. 7 is a drawing to show a screen display example of the display section of the vehicle trouble diagnosis apparatus as the embodiment of the invention.

When the vehicle communication section 16 acquires the vehicle data specified in the parameter file from the ECU 4, it returns the acquired vehicle data to the diagnostic routine instruction section 15 for displaying the vehicle data on the screen of the display section 8 using the browser software. For example, FIG. 6 shows a display example when self-diagnosis data of the ECU 4 (code indicating a part where a trouble possiblly occur (which is referred to as DIAG CODE in FIG. 6)) is acquired as the vehicle data; names of the parts where troubles possiblly occur according to results of the self-diagnosis are displayed on the screen. FIG. 7 shows a display example when data indicating the vehicle conditions such as the $O_2$ sensor output value (described as SERVICE DATA in FIG. 7) is acquired as the vehicle data. Here, time changes of outputs of $O_2$ sensor, AFS (air flow sensor), water temperature sensor, and TPS (throttle position sensor) are displayed as a graph.

Figure 8:
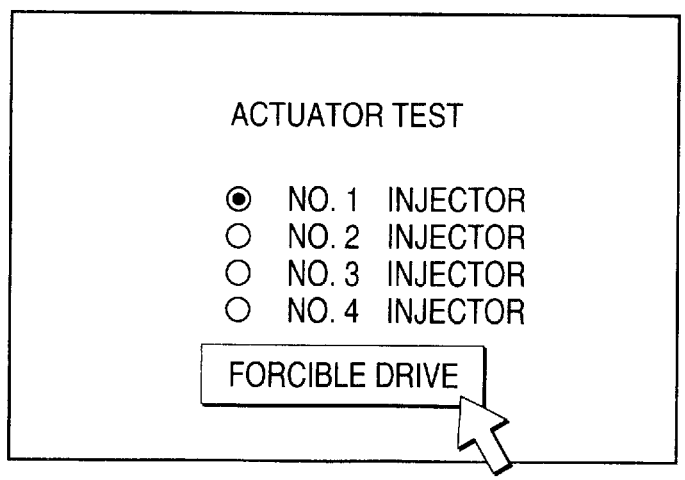
FIG. 8 is a drawing to show a screen display example of the display section of the vehicle trouble diagnosis apparatus as the embodiment of the invention.

The vehicle communication section 16 also has a function of instructing the ECU 4 to forcibly drive actuators of the vehicle (injector, air bypass control solenoid valve, etc.,) as a test in addition to the function of acquitting the vehicle data from the ECU 4 as described above. The forcible driving (test) of the actuators is executed for checking the operation for trouble diagnosis, is converted into HTML data as a part of the troubleshooting described in maintenance handbook, and is displayed on the screen in the interactive mode by the diagnostic routine instruction section 15 as required. FIG. 8 shows a display example when the injector is forcibly driven. The trouble diagnostician operates the input section 7 to select the injector to be forcibly driven from among the injectors No. 1 to No. 4 and further select a FORCIBLE DRIVE button, whereby the diagnostic routine instruction section 15 issues an instruction to the vehicle communication section 16, which then outputs a forcible driving signal of the selected injector to the ECU 4.

Figure 9:
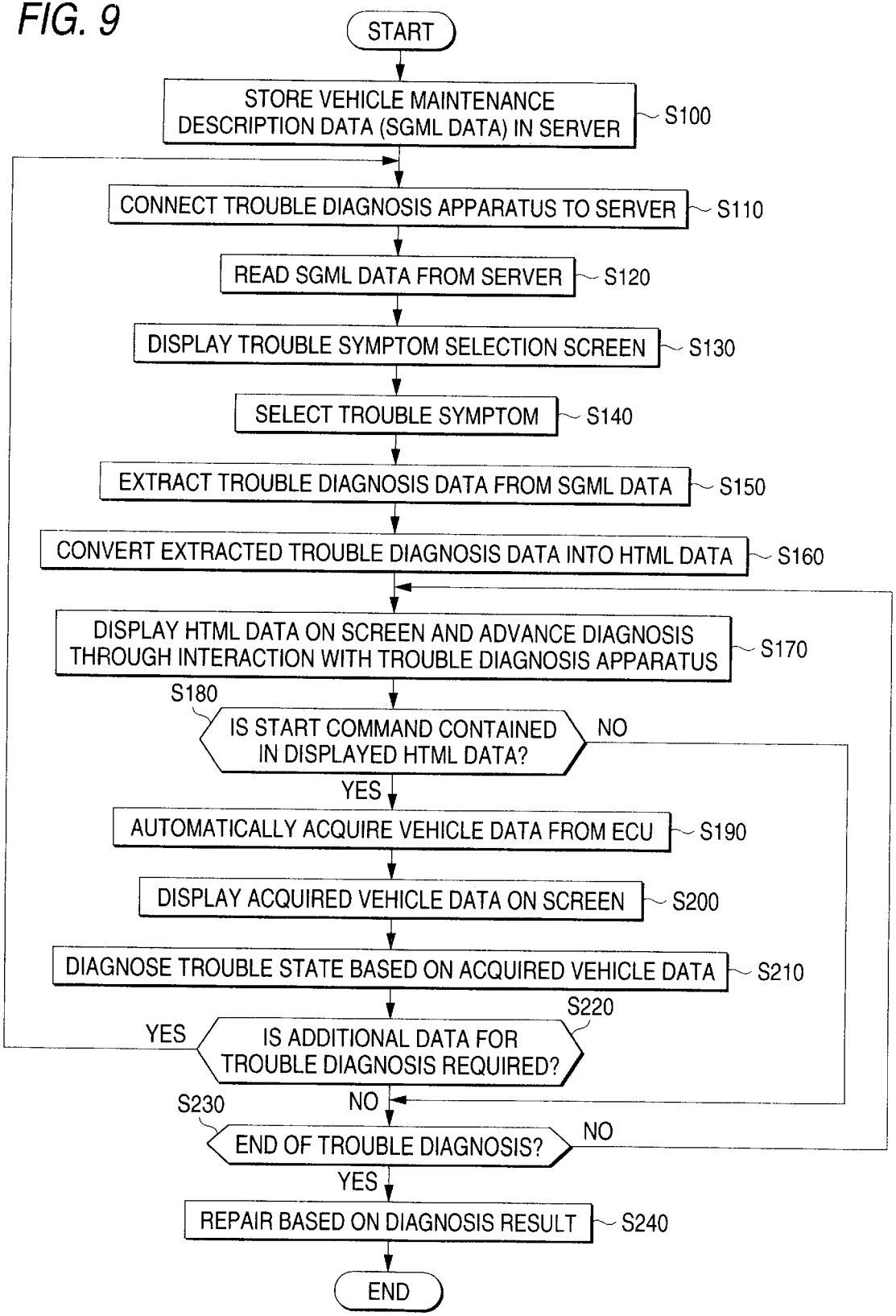
FIG. 9 is a flowchart to describe a vehicle trouble diagnosis method as one embodiment of the invention.

Next, a vehicle trouble diagnosis method using the trouble diagnosis system according to the embodiment of the invention as described above (a vehicle trouble diagnosis method as one embodiment of the invention) will be discussed again using FIGS. 4 to 7 and 10 with reference to a flowchart of FIG. 9.

First, the maintenance handbook description contents are converted into data in the SGML format as a preliminary step to conducting trouble diagnosis using the trouble diagnosis system. At the time, in the description part concerning the trouble diagnosis in the maintenance handbook, a tag defining the part as the description concerning the trouble diagnosis is set to distinguish the part from any other part. The prepared SGML data of in the maintenance handbook (vehicle maintenance description data) is recorded in the server 2 in the central office connected to the garages by communication lines at step S100.

Next, in each garage, if vehicle trouble diagnosis is required, first, the trouble diagnosis apparatus 1 is connected to the communication line for connection to the server 2 at step S110.

The SGML data is downloaded from the server 2 and is recorded in a storage section of the trouble diagnosis apparatus 1 (RAM, hard disk, etc.,) at step S120 (data read step).

In the trouble diagnosis apparatus 1, the tab attached to the read SGML data is retrieved and the data corresponding to the trouble symptom selection screen is extracted and is converted into HTML data. First, the trouble symptom selection screen is displayed on the screen of the display section 8 as shown in FIG. 10 at step S130.

The trouble symptom selection screen is a screen for the trouble diagnostician to select the trouble symptom to be diagnosed; the trouble diagnostician uses the input section 7 to select the trouble symptom on the trouble symptom selection screen at step S140. Here, the trouble symptom selection screen concerning a fuel system is displayed as an example of the trouble symptom selection screen.

When the trouble diagnostician selects the trouble symptom, in the trouble diagnosis apparatus 1, the trouble diagnosis data corresponding to the selected trouble symptom is further extracted from among the SGML data at step S150. The extracted trouble diagnosis data is converted into HTML data. At the time, a check is made to see if a predetermined keyword indicating the inspection item requiring acquisition of vehicle data is contained in the trouble diagnosis data and if the keyword is detected in the trouble diagnosis data, a start command for starting the vehicle communication program is added to the provided HTML data at step S160.

The provided HTML data is displayed on the screen of the display section 8 as shown in FIG. 5 for displaying trouble diagnosis routine instructions given to the trouble diagnostician in the interactive mode. The trouble diagnostician proceeds with trouble diagnosis according to the instruction displayed on the screen of the display section 8 by the trouble diagnosis apparatus 1 at step S170 (trouble diagnosis step). The screen in FIG. 5 is a screen displayed when ENGINE STOP AT START TIME (PASS OUT) is selected as the trouble symptom on the trouble symptom selection screen shown in FIG. 10.

In the trouble diagnosis apparatus 1, when the HTML data is displayed on the display section 8, whether or not the HTML data contains a start command is determined at step S180. If a start command is contained, the trouble diagnosis apparatus 1 starts the vehicle communication program, communicates with the ECU 4, automatically acquires the vehicle data for trouble diagnosis from the ECU 4 at step S190 (automatic vehicle data acquisition step), and displays the acquired vehicle data on the screen of the display section 8 as shown in FIG. 6 or 7 at step S200. On the other hand, if a start command is not contained at step S180, control goes to step S230 described later.

The trouble diagnostician sees the vehicle data displayed on the screen and diagnoses the trouble state of the vehicle at step S210. Whether or not trouble diagnosis data needs to be added is determined from the diagnosis contents at step S220. If it is determined that trouble diagnosis data needs to be added, control returns to step S110 and connection to the server 2 is made and the input section 7 is operated for reading additional data of the SGML data from the server 2 (additional data read step). The trouble diagnosis data is extracted from among the read additional SGML data and is converted into HTML data and the HTML data is displayed on the screen of the display section 8 for displaying additional trouble diagnosis routine instructions given to the trouble diagnostician in the interactive mode. The trouble diagnostician further proceeds with trouble diagnosis according to the additional instruction (additional diagnosis step). On the other hand, if adding the trouble diagnosis data is not required at step S220, control goes to step S230.

Whether or not the trouble diagnosis is complete in a general way is determined at step S230. If the trouble diagnosis is complete, control returns to step S170 and diagnosis is further proceeded with through the interaction with the trouble diagnosis apparatus 1 via the display section 8 and the input section 7. Upon completion of the trouble diagnosis in a general way, the vehicle is repaired based on the diagnosis result provided by the trouble diagnosis apparatus 1 at step S240.

Thus, according to the trouble diagnosis system, the trouble diagnosis data used for trouble diagnosis can be acquired from the server 2 over a communication line, so that in each garage, the need for inputting data is eliminated and time and labor for inputting data can be saved and the fear of inputting erroneous data can also be eliminated.

Since the trouble diagnostician can conduct vehicle trouble diagnosis through the interaction with the trouble diagnosis apparatus 1 via the display section 8 and the input section 7, he or she can conduct trouble diagnosis according to a reliable routine. Since the trouble diagnosis apparatus 1 automatically acquires the vehicle data required for trouble diagnosis from the ECU 4 of the vehicle 3 and displays the vehicle data on the screen, even the trouble diagnostician having poor experience can conduct rapid and reliable trouble diagnosis. Additional trouble diagnosis data can be read from the server 2 in response to the acquisition result of the vehicle data and the trouble diagnosis can be further proceeded with through the interaction with the trouble diagnosis apparatus 1, so that more accurate trouble diagnosis can be conducted.

Further, the SGML format does not depend on specific systems or programs and thus the description of each maintenance handbook is converted into data in the SGML format, whereby the data can be used for various applications not only of trouble diagnosis with the data converted into HTML data, but also of printing the maintenance handbook using the SGML data, for example, so that an increase in costs because of preparing dedicated trouble diagnosis data can also be prevented.

Although the vehicle trouble diagnosis apparatus and the vehicle trouble diagnosis as the embodiments of the invention have been described, the invention is not limited to the specific embodiments and various modifications can be made without departing from the spirit and the scope of the invention.

For example, in the above-described embodiment, the vehicle maintenance description data is converted into data in the SGML format for storage in the server 2 and the trouble diagnosis apparatus 1 converts trouble diagnosis data extracted from the vehicle maintenance description data into the HTML format. However, extraction of the trouble diagnosis data from the vehicle maintenance description data and conversion of the extracted trouble diagnosis data to the HTML format may be executed in the server 2.

It is also possible to previously store the trouble diagnosis data in the HTML format in the server 2 from the beginning, of course. In this case, it is not necessary to provide the conversions processing section in the trouble diagnosis apparatus 1 for converting the SGML data into HTML data, and the data processing speed can be increased.

The data structure in the open format is not limited to the SGML data and may be any if it does not depend on specific systems or programs. Likewise, the data structure that can be displayed in the interactive mode is not limited to the HTML data either.

As described above in detail, according to the vehicle trouble diagnosis method of the invention, the trouble diagnosis data used for trouble diagnosis can be acquired by connecting the computer to the server, so that the need for manually inputting data to the computer is eliminated and time and labor for inputting data can be saved and the fear of inputting erroneous data can also be eliminated. Since the trouble diagnosis is proceeded with in the interactive mode with the computer, it can be conducted according to a reliable routine. Further, the vehicle data required for trouble diagnosis is automatically acquired by the computer from the electronic control unit of the vehicle, so that the trouble state of the vehicle can be diagnosed rapidly and reliably regardless of the skill of the trouble diagnostician.

If additional new trouble diagnosis data is read into the computer from the server in response to the acquisition result of the vehicle data and the trouble diagnosis is further proceeded with through the interaction with the computer using the new read trouble diagnosis data, more accurate trouble diagnosis can be conducted.

Further, if the trouble diagnosis data is stored in the server as a data structure in an open format as a part of vehicle maintenance description data and to proceed with the trouble diagnosis, the trouble diagnosis data is extracted from the vehicle maintenance description data and is converted into a data structure that can be displayed in the interactive mode, an increase in costs can be prevented because dedicated trouble diagnosis data need not be prepared.

According to the vehicle trouble diagnosis apparatus of the invention, the trouble diagnosis data used for trouble diagnosis can be read from the server, so that the need for manually inputting data is eliminated and time and labor for inputting data can be saved and the fear of inputting erroneous data can also be eliminated. Since an instruction of the trouble diagnosis routine is given in the interactive mode through the display section and the input section, the trouble diagnostician can conduct trouble diagnosis according to the reliable routine. Further, the vehicle data required for trouble diagnosis is automatically acquired from the electronic control unit of the vehicle and the acquisition result of the vehicle data is displayed on the display section, so that the trouble diagnostician can diagnose the trouble state of the vehicle reliably regardless of the skill of the trouble diagnostician.

Further, if the trouble diagnosis data is extracted from the vehicle maintenance description data of a data structure in an open format stored in the server and is converted into a data structure that can be displayed in the interactive mode, an increase in costs can be prevented because dedicated trouble diagnosis data need not be prepared.

According to the computer-readable record medium recording the trouble diagnosis program of the invention, the recorded trouble diagnosis program is executed in the computer, whereby time and labor for manually inputting data can be saved, the fear of inputting erroneous data can be eliminated, an instruction of the trouble diagnosis routine is given in the interactive mode through the display section and the input section, so that the trouble diagnostician can conduct trouble diagnosis according to the reliable routine, and further, the vehicle data required for trouble diagnosis is automatically acquired from the electronic control unit of the vehicle and the acquisition result of the vehicle data is displayed on the display section, so that the trouble diagnostician can diagnose the trouble state of the vehicle reliably regardless of the skill of the trouble diagnostician.

What is claimed is:

1. A vehicle trouble diagnosis method comprising:
   connecting a computer to an electronic control unit of a vehicle;
   connecting the computer to a server storing trouble diagnosis data required for trouble diagnosis;
   reading the trouble diagnosis data from the server;
   proceeding with trouble diagnosis in an interactive mode according to information on a display and instructions from an input section to give an instruction of a trouble diagnosis sequence; and
   automatically obtaining vehicle data from the electronic control unit using the trouble diagnosis data.

2. The vehicle trouble diagnosis method as claimed in claim 1 further comprising:
   adding new trouble diagnosis data from the server to the computer in accordance with acquisition results of the vehicle data at the automatic vehicle data acquisition step; and
   then proceeding with the trouble diagnosis through interaction by a user with the computer using the new read trouble diagnosis data.

3. The vehicle trouble diagnosis method as claimed in claim 1, wherein the trouble diagnosis data written in an open format is stored in the server as a part of vehicle maintenance description data, and at the trouble diagnosis step, the trouble diagnosis data is extracted from the vehicle maintenance description data, and the trouble diagnosis data is converted into data to be displayed on a display section, whereby the trouble diagnosis is proceeded through interaction by a user with the computer.

4. The vehicle trouble diagnosis method as claimed in claim 1, wherein said trouble diagnosis data includes the converted contents of one or more maintenance handbooks.

5. The vehicle trouble diagnosis method as claimed in claim 1, further comprising:
   displaying the vehicle data on a display Connected to the computer.

6. The vehicle trouble diagnosis method as claimed in claimed 1, wherein said step of proceeding with trouble diagnosis, further comprises:
   displaying a trouble symptom selection screen on a display connected to the computer;
   receiving input from the user indicating one or more trouble symptoms; and
   extracting relevant data from the trouble diagnosis data corresponding to the indicated one or more trouble symptoms.

7. The vehicle trouble diagnosis method as claimed in claimed 6, further comprising:
   detecting whether the trouble diagnosis data contains a predetermined keyword indicating the need for the vehicle data.

8. A vehicle trouble diagnosis apparatus comprising;

a display section for displaying information;

an input section for inputting instructions from an user;

a server connection interface for connecting to a server storing trouble diagnosis data required for trouble diagnosis;

a vehicle connection interface for connecting to an electronic control unit of a vehicle;

a data read section for reading the trouble diagnosis data from the server via the server connection interface;

a diagnostic sequence instruction section for processing the trouble diagnosis data in an interactive mode according to the information on the display section and the instructions from the input section to give an instruction of a trouble diagnosis sequence; and an automatic vehicle data acquisition section for automatically acquiring vehicle data from the electronic control unit via the vehicle connection interface in accordance with the instruction of the diagnostic sequence instruction section, the automatic vehicle data acquisition section for displaying the acquired vehicle data on the display section.

9. The vehicle trouble diagnosis apparatus as claimed in claim 8 wherein the trouble diagnosis data is formed as a part of vehicle maintenance description data having a data structure in an open format, the vehicle trouble diagnosis apparatus further comprising:

an extraction section for extracting the trouble diagnosis data from the vehicle maintenance description data; and a conversion processing section for converting the extracted trouble diagnosis data into data displayed in the interactive mode, wherein the diagnostic routine instruction section displays the trouble diagnosis data after the conversion, thereby giving the trouble diagnosis routine instruction in the interactive mode.

10. A computer-readable record medium recording a trouble diagnosis program to be executed in a computer, the trouble diagnosis program comprising:

connecting the computer to an electronic control unit of a vehicle;

connecting the computer to a server storing trouble diagnosis data required for trouble diagnosis;

reading the trouble diagnosis data from the server;

proceeding with trouble diagnosis in an interactive mode according to information on a display and instructions from an input section to give an instruction of a trouble diagnosis sequence; and automatically obtaining vehicle data from the electronic control unit using the trouble diagnosis data.

11. The computer-readable record medium as claimed in claim 10, the trouble diagnosis program further comprising:

adding new trouble diagnosis data from the server to the computer in accordance with acquisition results of the vehicle data at the automatic vehicle data acquisition step; and then, proceeding with the trouble diagnosis through interaction by a user with the computer using the new read trouble diagnosis data.

12. The computer-readable record medium as claimed in claim 10, wherein the trouble diagnosis data written in an open format is stored in the server as a part of vehicle maintenance description data, and wherein at the trouble diagnosis step, the trouble diagnosis data is extracted from the vehicle maintenance description data, and the trouble diagnosis data is converted into data to be displayed on a display section, whereby the trouble diagnosis is proceeded with through interaction by a user with the computer.

13. A vehicle trouble diagnosis method comprising:

connecting a computer to an electronic control unit of a vehicle;

connecting the computer to a server storing trouble diagnosis data required for trouble diagnosis;

reading the trouble diagnosis data from the sewer;

displaying a trouble symptom selection screen on a display connected to the computer;

receiving input from the user indicating one or more trouble symptoms;

extracting relevant data from the trouble diagnosis data corresponding to the indicated one or more trouble symptoms;

detecting whether the trouble diagnosis data contains a predetermined keyword indicating the need for the vehicle data; and when said predetermined keyword is detected, automatically obtaining vehicle data from the electronic control unit using the trouble diagnosis data.

* * * * *